(12) United States Patent
Martinez et al.

(10) Patent No.: US 8,451,356 B2
(45) Date of Patent: May 28, 2013

(54) SYSTEM AND METHOD FOR CORRECTING ARTIFACTS IN SEQUENTIAL IMAGERS CAUSED BY TRANSIENT LIGHT DISTURBANCES

(75) Inventors: Juan A. Martinez, Hewitt, NJ (US); Andrew M. Berger, Pearl River, NY (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 518 days.

(21) Appl. No.: 12/379,450

(22) Filed: Feb. 23, 2009

(65) Prior Publication Data

US 2010/0091141 A1 Apr. 15, 2010

Related U.S. Application Data

(60) Provisional application No. 61/195,861, filed on Oct. 9, 2008.

(51) Int. Cl.
*H04N 3/14* (2006.01)
(52) U.S. Cl.
USPC .......................................... 348/296; 348/248

(58) Field of Classification Search
USPC .......... 348/217.1, 222.1, 226.1, 227.1, 228.1, 348/229.1, 230.1, 254, 362, 370, 371, 247, 348/248, 296, 302, 314
See application file for complete search history.

(56) References Cited

U.S. PATENT DOCUMENTS

| | | | |
|---|---|---|---|
| 5,734,425 A * | 3/1998 | Takizawa et al. | 348/231.9 |
| 7,148,922 B2 | 12/2006 | Shimada | |
| 7,298,401 B2 * | 11/2007 | Baer | 348/226.1 |
| 7,502,054 B2 * | 3/2009 | Kalapathy et al. | 348/226.1 |
| 7,633,533 B2 * | 12/2009 | Cho et al. | 348/226.1 |
| 2003/0067546 A1 * | 4/2003 | Asano | 348/226.1 |
| 2006/0018653 A1 | 1/2006 | Kido | |
| 2006/0262211 A1 | 11/2006 | Kido | |
| 2008/0075382 A1 * | 3/2008 | Sugeno et al. | 382/270 |
| 2008/0284870 A1 * | 11/2008 | Yokoi | 348/228.1 |
| 2011/0001859 A1 * | 1/2011 | Matsuura et al. | 348/296 |

* cited by examiner

*Primary Examiner* — Aung S Moe
*Assistant Examiner* — Chriss Yoder, III
(74) *Attorney, Agent, or Firm* — Haverstock & Owens LLP (57) ABSTRACT

An example embodiment may include a system and method for correcting luminance disturbances in an imaging device. The example method can detect a luminance level disturbance in the output of an imager and provide a signal to a digital signal processor (DSP) that a luminance disturbance was detected, before the DSP begins processing the output of the imager. The DSP can then correct or adjust the resulting output to compensate for the luminance disturbance.

11 Claims, 7 Drawing Sheets

SYSTEM AND METHOD FOR CORRECTING ARTIFACTS IN SEQUENTIAL IMAGERS CAUSED BY TRANSIENT LIGHT DISTURBANCES

CROSS REFERENCE TO RELATED APPLICATIONS

This application claims the benefit of U.S. provisional application Ser. No. 61/195,861, filed on Oct. 9, 2008, the entire contents of which are hereby incorporated by reference.

BACKGROUND OF THE INVENTION

1. Field of the Invention

This invention relates generally to CMOS imaging devices, and more particularly to a device and method for correcting lighting artifacts caused by transient light, such as light strobes or flashes, in images captured by CMOS imagers.

2. Description of the Related Art

CMOS imagers are on form of light sensors or transducers that convert optical images into electric signals for digital storage or transmission. CMOS imagers are rapidly becoming the preferred imager over CCD for video and still digital cameras of all resolutions. CMOS devices are preferred over CCD devices largely due to their benefits over CCD devices with respect to cost, ease of manufacture, lower power consumption, and lower heat.

Conventional CMOS imagers provide a sequential output, whereby pixels are read from top to bottom of the device, line by line. In this sense, a CMOS imager operates similar to a flatbed scanner, reading a line at a time. This behavior makes the CMOS susceptible to time sensitive disturbances. For example, when using a conventional CMOS imaging device, a quick luminance disturbance may only appear on the portion of a frame that corresponds to the pixel rows that were captured during the time of the disturbance. This means that quick disturbances, such as strobe lights or flashes, will only be visible in a portion of a given frame, or may begin in the middle of one frame and end in the middle of another frame.

This phenomenon is not visible in images taken with CCD devices. CCD imagers capture and output a complete image at a time. Therefore, in CCD imagers, a sudden luminance disturbance, such as a flash, affects a whole frame or picture at a time.

This image artifact or disturbance, whereby a flash only affects a portion of a frame, has been accepted by the professional users of CMOS imaging devices. However, end-users object to this artifact. Most end-users are more familiar with a flash used in conjunction with CCD imagers where, when taking pictures, the entire frame brightens. Therefore, end-users have been neither comfortable nor familiar with the behavior of CMOS imaging devices. Software exists that addresses this behavior in video in post-production. The software eliminates the artifacts by comparing the previous frame or the following frame with the current frame, and then replacing the brightened frame with the previous or following frame. As such, multiple flashes result in picture freezing. This introduces a whole new set of motion artifacts due to the variance between the current frame and the previous or following frame.

Figure 1:
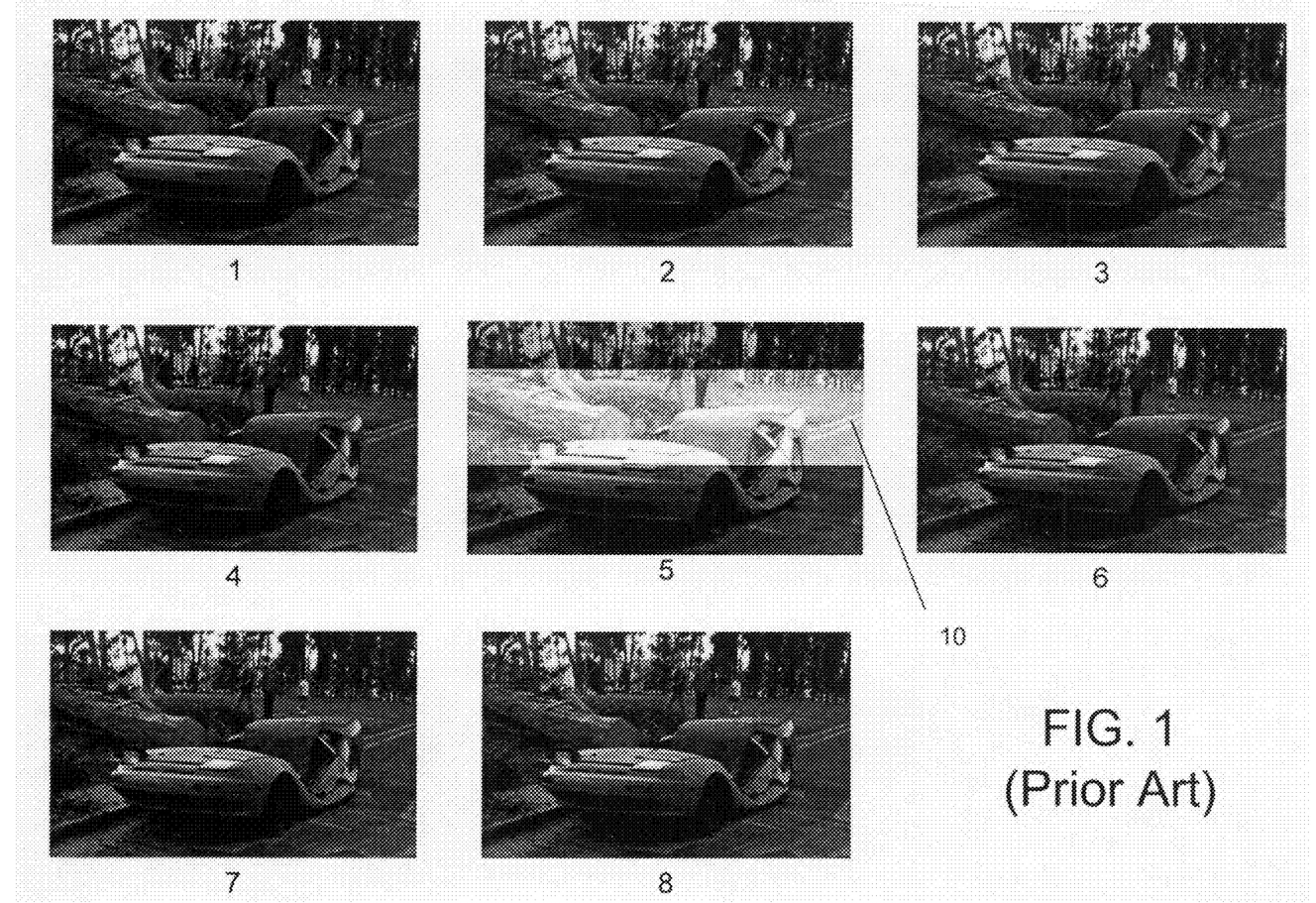
FIG. 1 illustrates video frames of a scene taken using a conventional CMOS imaging device.

FIG. 1 illustrates video frames taken at a car accident scene using a conventional CMOS imaging device. Frames 1-4 and 6-8 illustrate the same general luminance levels. Frame 5, however, illustrates an image taken in conjunction with a quick luminance disturbance, such as a flash, light strobe, or lightening strike. Since the luminance disturbance is quick, it only affects a portion 10 of frame 5 due to the sequential operating nature of the CMOS. Since the luminance disturbance is shorter than the time required to capture all the lines in the frame, the artifact caused by the luminance disturbance only appears in a portion 10 of the frame.

As explained above, CMOS luminance disturbances are not limited to only a single frame. A luminance disturbance may span more than one frame. In such a case, the first and last frames in the span will have one portion appear at regular luminance levels while the rest of the frame may have heightened luminance levels.

Figure 2:
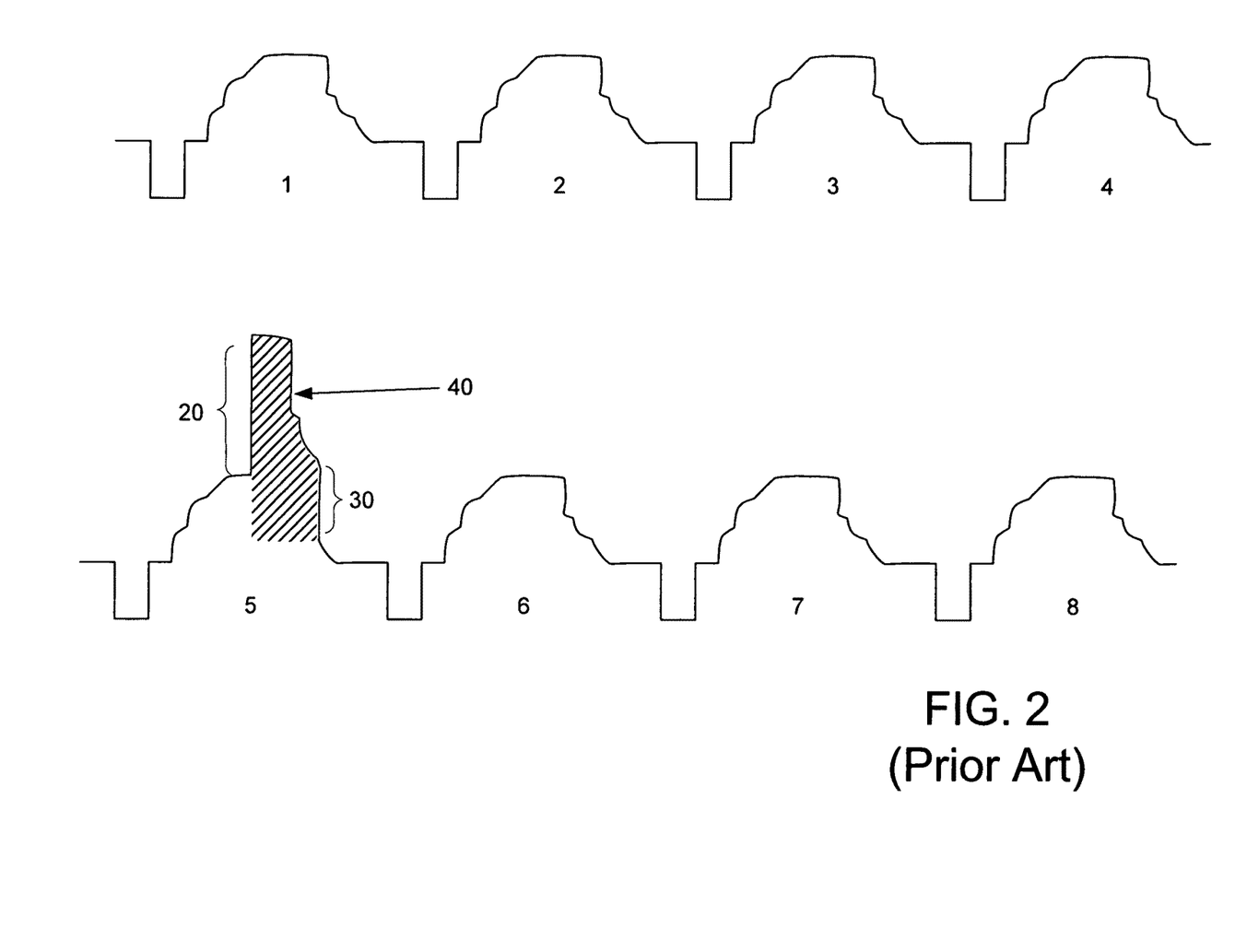
FIG. 2 illustrates a timing diagram of the luminance levels of the video frames in FIG. 1.

FIG. 2 illustrates a timing diagram of the luminance levels of the pixels from the conventional CMOS imaging device captured in frame 1-8 of FIG. 1. The recorded luminance levels for frames 1-4 are all similar, as are the luminance levels of frames 6-8. However, the timing diagram for frame 5 illustrates the effect 40 (shaded) of the luminance disturbance on the recorded luminance levels. The beginning of the luminance disturbance causes a large, sudden gain 20 in the luminance levels, and the end of the luminance disturbance causes a large, sudden drop 30 in the luminance levels.

There is currently no compensation for this CMOS artifact/phenomenon in any cameras. As such, absent software correction, images captured by CMOS imaging devices may show frames where a portion of the image is brightened by the luminance disturbance.

SUMMARY OF THE INVENTION

The present invention provides a system and method for correcting artifacts in sequential imagers caused by luminance disturbances.

An example embodiment of the present invention may include a method for correcting artifacts caused by luminance disturbances in an imaging device. The example method may include reading output from an imager, detecting a luminance level disturbance in the output of the imager, providing a signal to a digital signal processor (DSP) that a luminance disturbance was detected in the output of the imager before the DSP begins processing the output of the imager, and correcting the output of the DSP to compensate for the luminance disturbance.

The imager may capture images by sequentially capturing pixels of an image. For example, the imager may be a CMOS imager or any imager that sequentially captures rows of pixels of an image.

Detecting the luminance disturbance may include matching the luminance levels of the output of the imager against a predetermined pattern. Alternatively, detecting the luminance disturbance may include identifying a predetermined change in luminance levels in the output of the imager over a predetermined period of time.

Another example embodiment may include an apparatus for capturing images that compensates for luminance disturbances. The apparatus embodiment may include an imager that captures image frames by sequentially capturing pixels of a frame, a detection unit coupled to the imager that monitors the output signal of the imager for a luminance disturbance, and a digital signal processor (DSP) coupled to the imager and detection unit that processes the output of the imager to produce digital images and corrects the output of the DSP to compensate for luminance disturbances based on a signal provided by the detection unit. The example embodiment may also include memory that stores a predetermined flash pattern. Furthermore, the DSP may include a luminance scaling component that changes the output from the imager based on a signal from the detection unit.

The present invention can be embodied in various forms, including business processes, computer implemented methods, computer program products, computer systems and networks, user interfaces, application programming interfaces, cameras, hardware, and the like, but not limited thereto.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 3A:
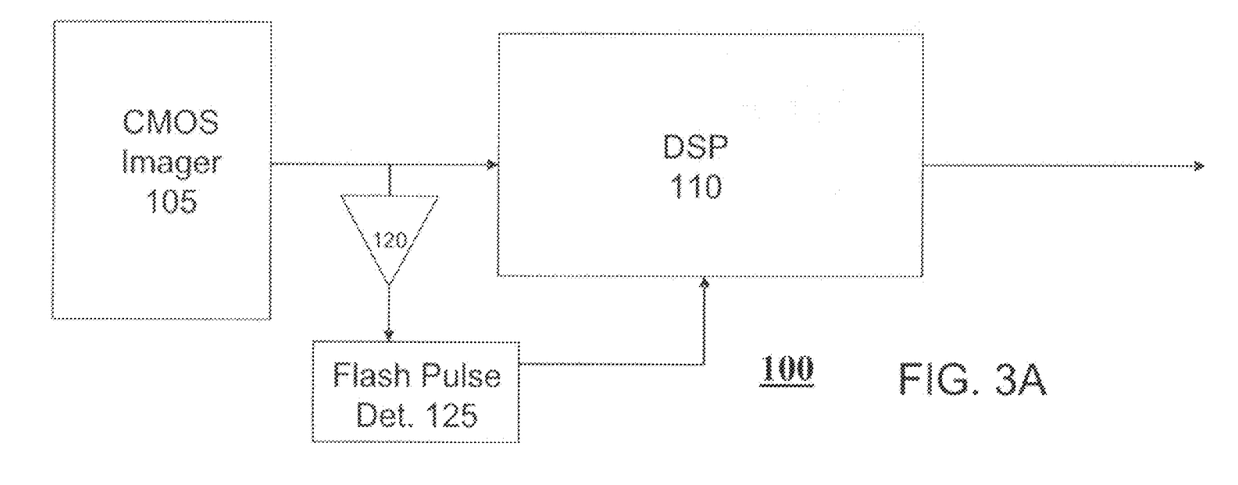
FIG. 3A illustrates the components of an example embodiment of a CMOS imaging device, in accordance with the present invention.
Figure 3B:
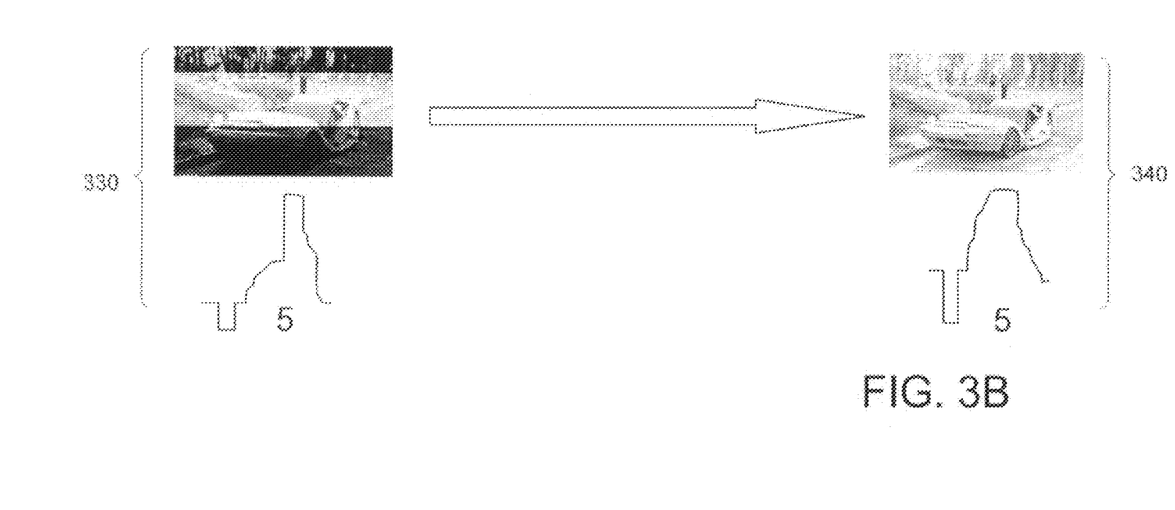
FIG. 3B illustrates the luminance levels and image before and after processing by an example digital signal processor, in accordance with the present invention.

FIG. 3A illustrates the components of an example embodiment of a imaging device 100 in accordance with the present invention. Imaging device 100 may include an imager 105, a digital signal processor (DSP) 110, a signal amplifier 120, and flash pulse detection unit 125. The output of imager 105 is provided to DSP 110 and amplifier 120. The output of amplifier 120 is provided to the flash pulse detection unit 125. The output of the flash pulse detection unit 125 is provided to DSP 110, to signal when a luminance disturbance is identified in the output of the imager 105. FIG. 3B illustrates the image and corresponding luminance levels 330 produced by imager 105 and the modified image and luminance levels 340 after the image is adjusted by DSP 110.

The imager 105 may be a CMOS imager or may alternatively be any image capture device that employs a sequential image capture mechanism. Alternatively, the imager 105 may be any imaging device that captures different portions of the picture frame over discrete periods of time.

The flash pulse detection unit 125 pattern matches the output of imager 105 to a known pattern associated with a luminance disturbance, such as a flash or light strobe. For example, flash pulse detection unit 125 may analyze the output of the imager 105 for changes in luminance that exceed a predetermined level within a predetermined time period. The flash pulse detection unit 125 may monitor the imager 105 output for level changes in the luminance levels of 50% or greater within one frame or less. Alternatively, the flash pulse detection unit 125 may monitor the output of imager 105 for any gain greater than 30%, 50%, or 70% of the pre-existing luminance level or maximum luminance levels. Furthermore, the minimum gain and time periods may be manually or automatically adjusted based on the ambient conditions, such as location, lighting, or frame rate. Finally, or alternatively, the flash pulse detection unit 125 may analyze the output of the imager 105 for changes in the black level that exceed a predetermined level within a predetermined time period.

Similarly, the flash pulse detection unit 125 may detect the end of a luminance disturbance by identifying changes in luminance that exceed a predetermined loss within a predetermined time period. For example, flash pulse detection unit 125 may monitor the output of imager 105 for a loss of 50% or more of the pre-existing luminance level or maximum luminance level. Furthermore, the luminance loss may also need to occur within a minimum period of time, such one frame or less. Alternatively, the flash pulse detection unit 125 may seek to identify any loss in the luminance levels of 33% or greater one frame or less, after an identified gain indicating a luminance disturbance. Similarly to the gain, the minimum loss and predetermined time period may be manually or automatically adjusted based on the ambient conditions, such as location, lighting, or frame rate.

Alternatively, or as a contingency, the flash pulse detection unit 125 may detect the end of a luminance disturbance when the imager provides any output having a luminance level below a minimum threshold. For example, a luminance level of less than, but not limited to, 30% may indicate the end of the luminance disturbance regardless of the time frame.

Furthermore, flash pulse detection unit 125 may detect luminance disturbances by comparing the output of the imager 105 against one or more pre-defined patterns associated with known luminance disturbances, such as a flash, light strobe, or lightening strike.

These pre-defined patterns and range values may be stored on a memory device within the flash pulse detection unit 125 or coupled to the flash pulse detection unit 125 (not shown).

In the example embodiment, a signal provided by the flash pulse detection unit 125 may reach the DSP 110 before the DSP 110 processes the output of imager 105. This may occur due to a processing delay in the DSP 110 (usually about one field or more) and the high-speed detection by the flash disturbance detector circuit 125. Alternatively, the output of imager 105 may be more intentionally delayed by buffering the image until the DSP 110 receives a signal from flash pulse detection unit 125 indicating that the flash pulse detection unit 125 has processed the frame.

After receiving both the output of imager 105 and the signal from flash pulse detection unit 125, the DSP 110 processes the frame and compensates for any identified luminance disturbances. Thereafter, the DSP 110 outputs the processed image.

Computing devices, such as those discussed herein generally, such as DSP 110 and/or flash pulse detection unit 125, may each include instructions executable by one or more processors. Computer-executable instructions may be compiled or interpreted from computer programs created using a variety of programming languages and/or technologies known to those skilled in the art, including, without limitation, and either alone or in combination, Java™, C, C++, Assembly, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

Similarly, the output of image 105, DSP 110, and flash pulse detection unit 125 may also produce output that may be stored on a computer readable medium or transmitted via a transmission medium.

A computer-readable medium includes any medium that participates in providing data (e.g., instructions or images), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic media, a CD-ROM, DVD, any other optical media, punch cards, paper tape, any other physical media with patterns of holes, a RAM, a PROM, an EPROM, a FLASH-EEPROM, any other memory chip or cartridge, a carrier wave as described hereinafter, or any other medium from which a computer can read.

Figure 4:
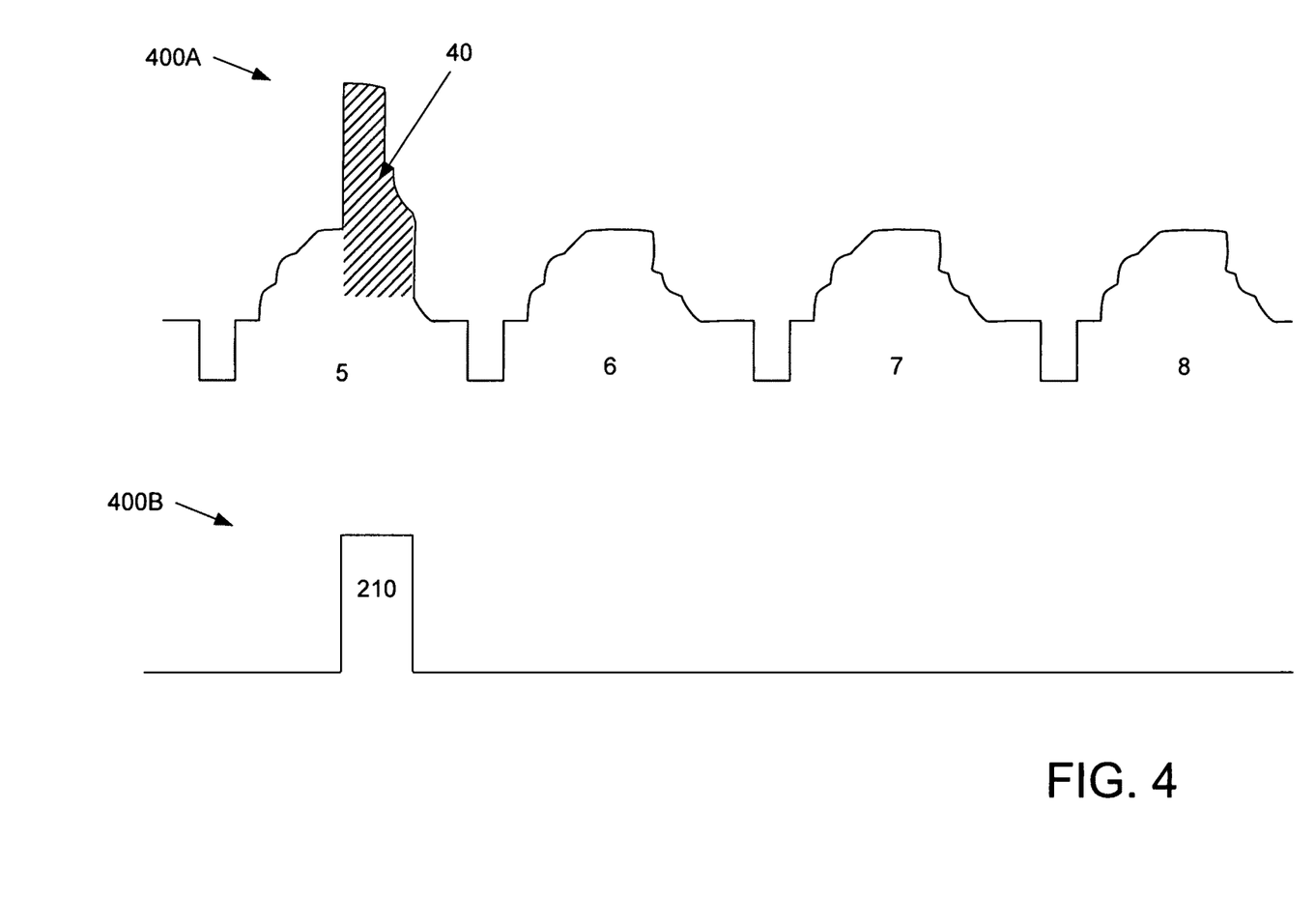
FIG. 4 illustrates a timing diagram produced by a CMOS imaging device, in accordance with the present invention.

FIG. 4 illustrates a timing diagram of the luminance levels from the output produced by the imager 105 and the corresponding signal produced by flash pulse detection unit 125. The upper portion 400A of the timing diagram illustrates the luminance levels of the image frames output by imager 105, which may be similar to that of a conventional imaging device illustrated in FIG. 2. The lower portion 400B of the timing diagram illustrates the output of flash pulse detection unit 125 in response to the luminance levels of the image frames output by imager 105. Frame 5 of the timing diagram shows the effect 40 of the luminance disturbance on the luminance level. Flash pulse detection unit 125 processes the output of imager 105, detects the luminance disturbance by monitoring the luminance levels, and produces a signal 210 that corresponds to the luminance disturbance.

In one embodiment, the output signal of the flash pulse detection unit 125 may only indicate the beginning and end of the luminance disturbance. In this case, the DSP 110 may need to analyze the output of the imager 105 to identify the proper level of compensation necessary to correct the image. Alternatively, flash pulse detection unit 125 may indicate the beginning and end of the luminance disturbance, as well as the intensity levels of the luminance disturbance. In this case, the DSP 110 may use the provided intensity levels to adjust the luminance levels of the screen.

Flash pulse detection unit 125 may detect the beginning of the luminance disturbance by identifying a sudden gain in luminance over a short time period. Inversely, the loss in luminance over a short time period following the luminance disturbance may serve to indicate the end of the luminance disturbance. The net change in luminance levels caused by the luminance disturbance may serve as a basis for adjusting frame 5. The detected luminance levels, as well as its corresponding time and amplitude, may be provided to the DSP 110.

The DSP may adjust the luminance levels of the frame exhibiting the luminance disturbance by adjusting the portion or portions of the frame that are not affected by the luminance disturbance. Modifying the portion or portions of the frame that are not affected by the luminance disturbance may be accomplished by scaling the luminance levels of the unaffected portions to match the luminance levels from the portions of the frame exhibiting the luminance disturbance.

Figure 5:
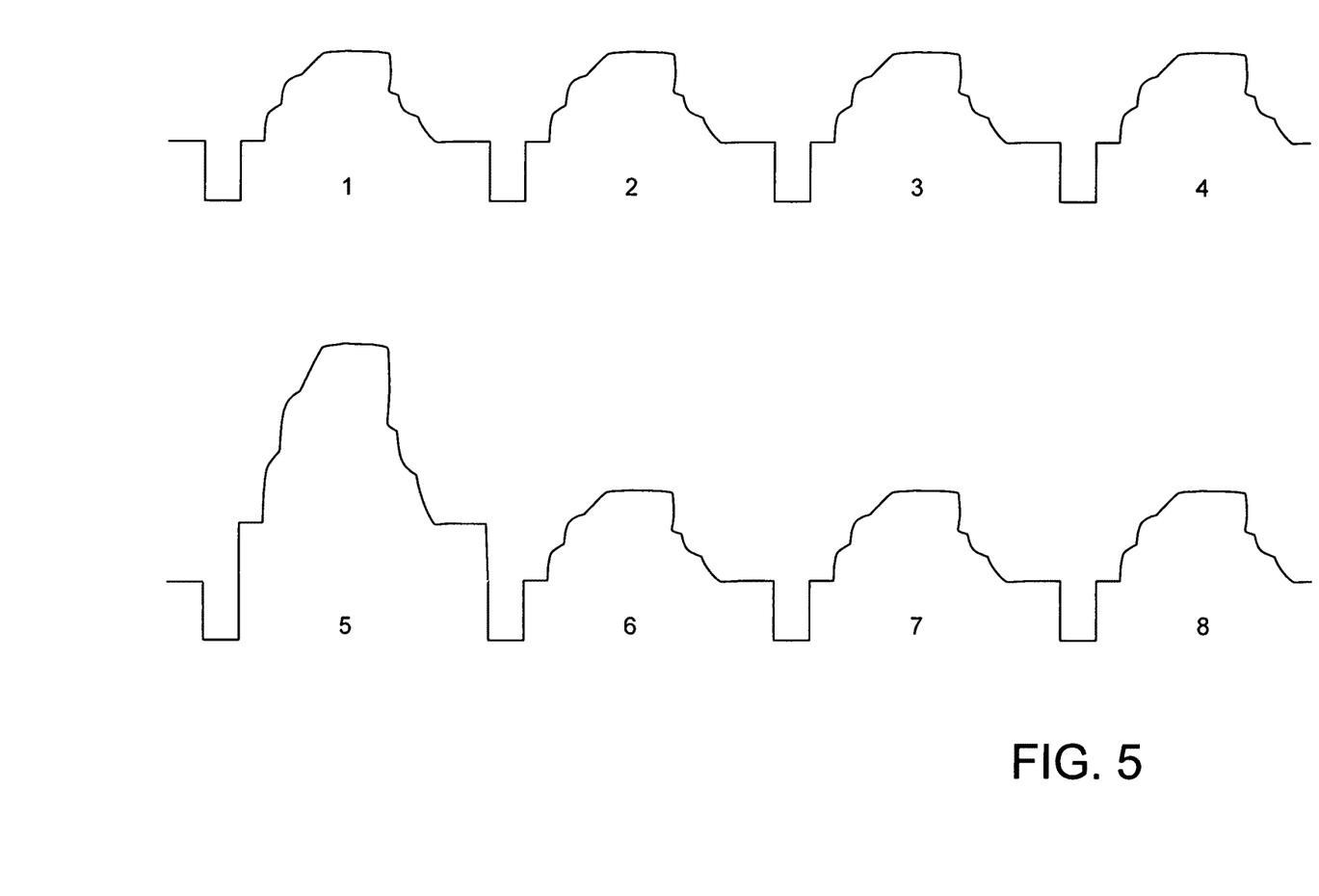
FIG. 5 illustrates the timing diagram of the luminance levels of video frames produced by a CMOS imaging device, in accordance with the present invention.

FIG. 5 illustrates the output of the imaging device 100 which incorporates flash pulse detection unit 125. The output of frames 1-4 and 6-8 are similar to those output by the prior conventional CMOS imaging device illustrated in FIG. 2. However, the luminance curve of frame 5 differs from the output of the conventional CMOS imaging device. Whereas the conventional CMOS imager illustrates an output having a light disturbance only within a portion of the output frame, the example embodiment compensates for the luminance disturbance by adjusting the luminance levels over the entire frame to match the luminance level during the disturbance. FIG. 5 illustrates how DSP 110 may adjust the luminance levels for the portions of the image prior to and after the flash luminance disturbance by scaling the luminance levels to match the image portion taken during the luminance disturbance. As a result, the entire image appears to have been captured during the luminance disturbance. In the case of a flash, the adjustment will cause the entire image to be affected by the flash.

Figure 6:
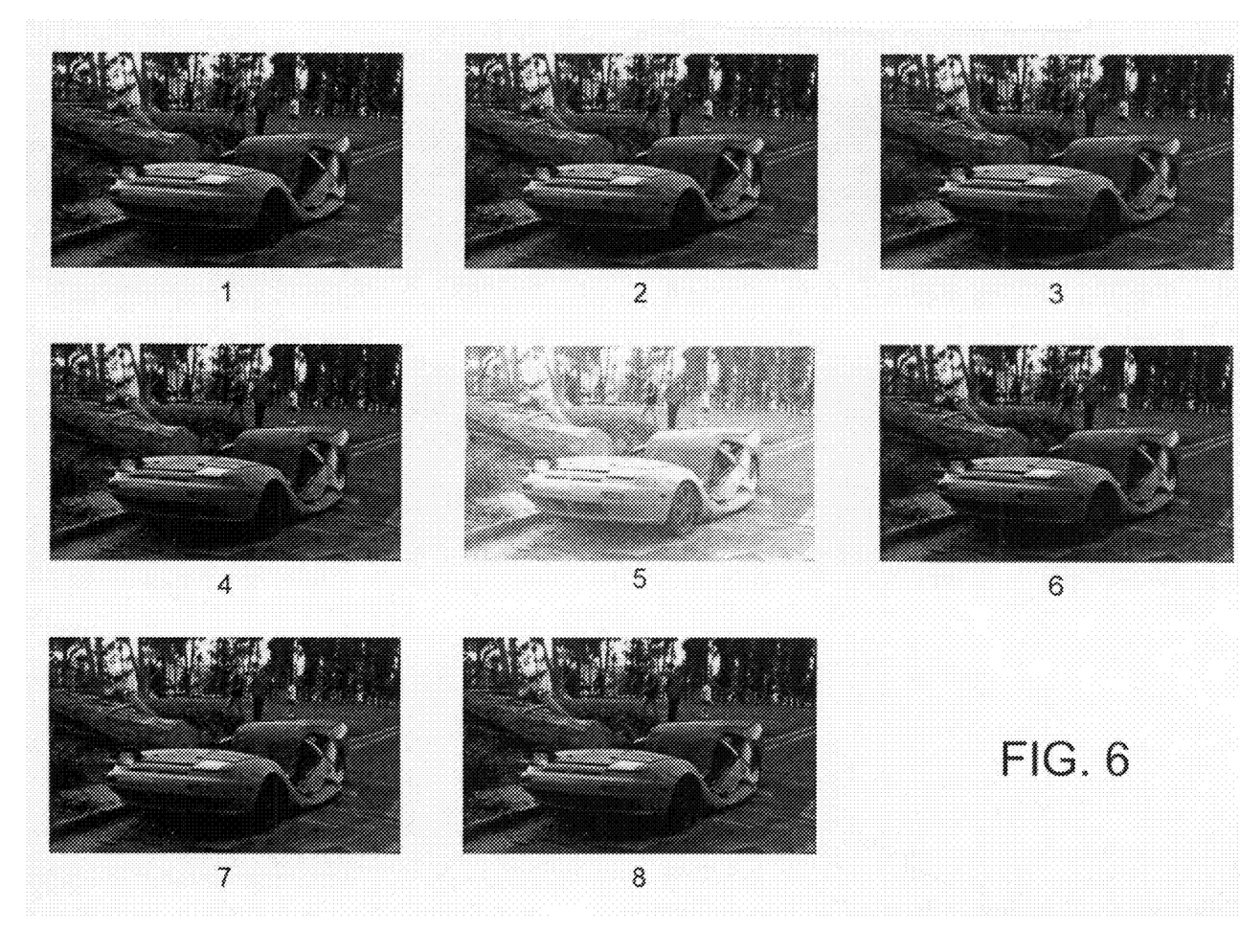
FIG. 6 illustrates the picture frames produced by a example embodiment of a CMOS imaging device, in accordance with the present invention.

FIG. 6 illustrates the picture frames produced by imaging device 100. Comparing FIG. 1 to FIG. 6 illustrates the difference between the images produced by the conventional CMOS imager and the example embodiment 100, respectively. Evident is the absence of the sudden, mid-frame change in luminance levels caused by the luminance disturbance when capturing frame 5. The present embodiment may modify the luminance levels of all or a portion of the pixels in frame 5 to appear as though the entire frame was captured during the luminance disturbance.

Figure 7:
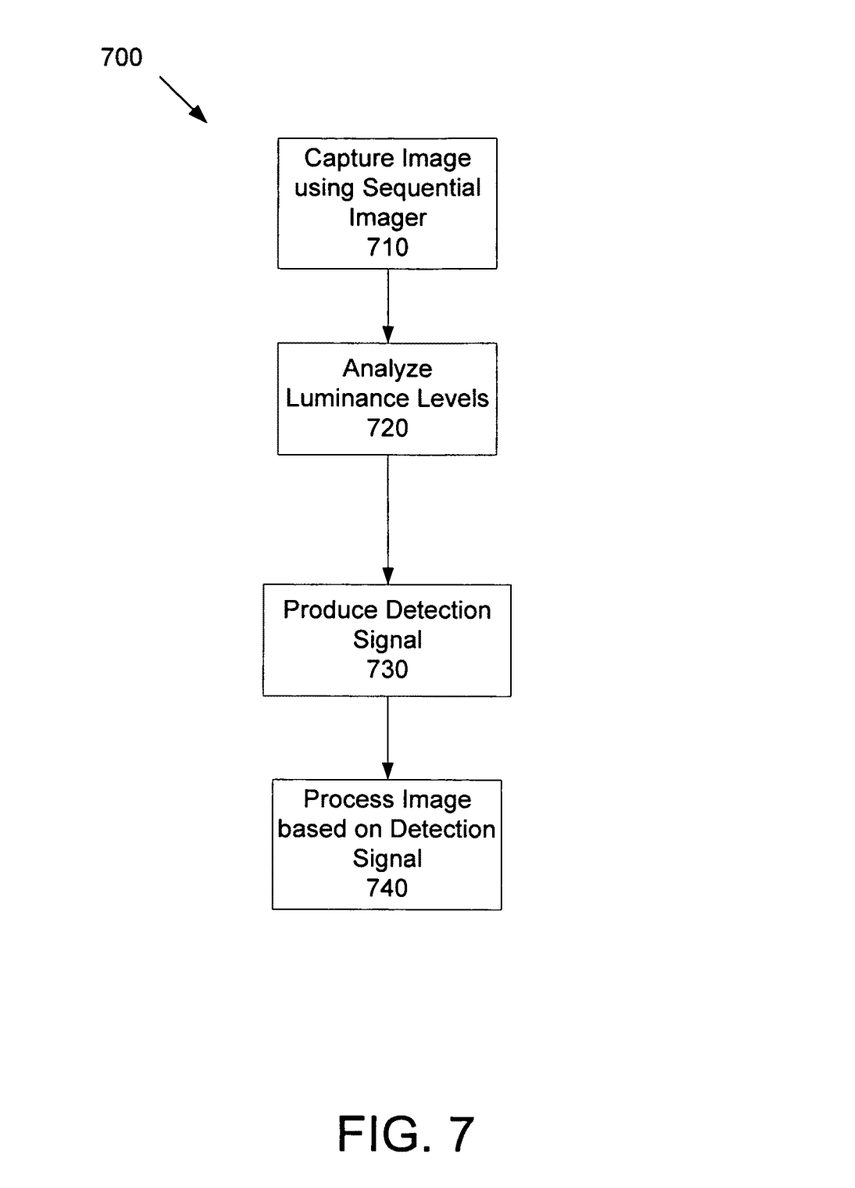
FIG. 7 illustrates the process of capturing an image and correcting the luminance used by a example embodiment of a CMOS imaging device, in accordance with the present invention

FIG. 7 illustrates a process 700 for capturing an image and correcting the luminance levels that may be used by an example embodiment of a CMOS imaging device, in accordance with the present invention At step 710, the imaging device 100 may capture an image or frame of a video using imager 105.

At step 720, the luminance levels of the output of imager 105 may be analyzed by detection unit 125 to identify luminance disturbances.

Based on the analysis in step 720, at step 730, the detection unit 125 may output a detection signal that is provided to DSP 110.

Finally, at step 740, the DSP 110 processes the output of imager 105 based on the detection signal provided by detection unit 125, and thereby address any artifacts caused by any luminance disturbances.

The example embodiment overcomes the artifacts caused by luminance disturbances that may be objectionable to end-users of CMOS devices. The present invention accomplishes this by causing the imaging device to behave similarly to CCD devices. As such, the end-users may become more receptive the use of CMOS based imaging devices, or any imaging device with sequential pixel capture.

While embodiments herein are discussed primarily with respect to a system embodiment, apparatus embodiment, and method that is applied generally to CMOS imaging devices, the present invention is not limited thereto. Various embodiments discussed herein are merely illustrative, and not restrictive, of the invention. For example, any image capture technology that employs sequential image capture may employ a similar mechanism as that disclosed to compensate for luminance disturbances. Furthermore, the technology may also benefit any imaging device that does not capture entire picture frames at once.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatuses, systems, assemblies, methods, components, materials, parts, and/or the like. In other instances, well-known structures, materials, or operations are not specifically shown or described in detail to avoid obscuring aspects of embodiments of the present invention.

Thus, embodiments of the present invention produce and provide a system and method for correcting artifacts in sequential imagers caused by luminance disturbances, such as, for example, light strobes or flashes. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for correcting luminance disturbances in an imaging device, the method comprising:
    reading pixel data output from a CMOS imager, wherein the CMOS imager captures images by sequentially capturing pixels of an image;
    detecting a beginning of a luminance disturbance in the image by detecting a sudden gain in luminance level, wherein the sudden gain in luminance level is characterized by a relative increase in luminance level that is greater than a predetermined gain value output from the CMOS imager that are separated in time by not more than a predetermined time value;
    detecting an ending of the luminance disturbance in the image by detecting a sudden loss in luminance level, wherein the sudden loss in luminance level is characterized by a relative decrease in luminance level that is greater than a predetermined loss value output from the CMOS imager that are separated in time by not more than the predetermined time value;
    providing a signal to a digital signal processor (DSP) that the luminance disturbance was detected in the output of the CMOS imager before the DSP begins processing the output of the imager, the signal including information about the beginning and ending of the luminance disturbance in the image; and
    correcting the output of the DSP to compensate for the luminance disturbance.

2. The method of claim 1, wherein the CMOS imager captures images by sequentially capturing rows of pixels of an image.

3. The method of claim 1, wherein the predetermined time value is one frame or less.

4. The method of claim 1, wherein the correcting step includes scaling only the luminance levels of portions of the output of the DSP corresponding to pixels not affected by the luminance disturbance.

5. The method of claim 1, wherein the signal includes information about the intensity of the luminance disturbance.

6. An apparatus for capturing images that compensates for luminance disturbances, comprising:
    a CMOS imager that captures image frames by sequentially capturing pixels of a frame;
    a detection unit coupled to the CMOS imager and configured to read pixel data output by the CMOS imager and detect a luminance disturbance by:
        detecting a beginning of the luminance disturbance in the image by detecting a sudden gain in luminance level, wherein the sudden gain in luminance level is characterized by a relative increase in luminance level that is greater than a predetermined gain value output from the CMOS imager that are separated in time by not more than a predetermined time value;
        detecting an ending of the luminance disturbance in the image by detecting a sudden loss in luminance level, wherein the sudden loss in luminance level is characterized by a relative decrease in luminance level that is greater than a predetermined loss value output from the CMOS imager that are separated in time by not more than the predetermined time value; and
    a digital signal processor (DSP) coupled to the imager and detection unit and configured to process the output of the CMOS imager to produce digital images and correct the output of the DSP to compensate for the luminance disturbance based on a signal provided by the detection unit, the signal including information about the beginning and ending of the luminance disturbance in the image.

7. The apparatus of claim 6, wherein the CMOS imager captures images by sequentially capturing rows of pixels of an image.

8. The apparatus of claim 6, wherein the DSP includes a luminance scaling component that changes the output from the CMOS imager based on the signal from the detection unit.

9. The apparatus of claim 8, wherein only the portions of the output of the DSP corresponding to pixels not affected by the luminance disturbance are changed based on the signal.

10. The apparatus of claim 6, wherein the predetermined time value is one frame or less.

11. The apparatus of claim 6, wherein the signal includes information about the intensity of the luminance disturbance.

* * * * *